(12) United States Patent
Simson et al.

(10) Patent No.: US 8,131,073 B2
(45) Date of Patent: Mar. 6, 2012

(54) APPARATUS, METHOD, AND MANUFACTURE FOR CORRECTING COLOR SHADING IN CMOS IMAGE SENSORS

(75) Inventors: Yonatan Shlomo Simson, Tel Aviv (IL); Artemy Baxansky, Nesher (IL)

(73) Assignee: CSR Technology Inc., San Jose, CA (US)

( * ) Notice: Subject to any disclaimer, the term of this patent is extended or adjusted under 35 U.S.C. 154(b) by 674 days.

(21) Appl. No.: 12/272,633

(22) Filed: Nov. 17, 2008

(65) Prior Publication Data

US 2010/0054588 A1    Mar. 4, 2010

Related U.S. Application Data

(60) Provisional application No. 61/094,326, filed on Sep. 4, 2008.

(51) Int. Cl.
*G06K 9/00* (2006.01)
(52) U.S. Cl. .................. 382/167; 382/162; 382/165
(58) Field of Classification Search .................. 382/162, 382/165, 167; 348/308; 283/902; 356/71; 399/4, 366; 358/501, 1.5, 518, 523
See application file for complete search history.

(56) References Cited

U.S. PATENT DOCUMENTS

| | | | | |
|---|---|---|---|---|
| 5,321,470 A | * | 6/1994 | Hasuo et al. | 399/366 |
| 5,434,649 A | * | 7/1995 | Hasuo et al. | 399/366 |
| 5,463,479 A | * | 10/1995 | Kuga | 358/518 |
| 5,583,614 A | * | 12/1996 | Hasuo et al. | 399/4 |
| 5,765,089 A | * | 6/1998 | Hasuo et al. | 399/366 |
| 6,185,404 B1 | * | 2/2001 | Hasuo et al. | 399/366 |
| 6,320,668 B1 | | 11/2001 | Kim | |
| 6,594,388 B1 | | 7/2003 | Gindele et al. | |
| 7,330,209 B2 | | 2/2008 | Osamato | |
| 2008/0158396 A1 | | 7/2008 | Fainstain et al. | |

FOREIGN PATENT DOCUMENTS

EP     1530375 A2     5/2005
JP     09233351 A  *  9/1997

* cited by examiner

*Primary Examiner* — Anh Hong Do
(74) *Attorney, Agent, or Firm* — Frommer Lawrence & Haug LLP; Jamie L. Wiegand

(57) ABSTRACT

A device for color shading correction is provided. Local color matching is performed as follows. For each pixel of the image that is being color matched, the RGB value is treated as a one-by-three matrix, which is multiplied by a three-by-three matrix that is generated during factory calibration. The matrix product is a one-by-three matrix that is used as the RGB value for the pixel in the color matched image.

17 Claims, 7 Drawing Sheets

US 8,131,073 B2

APPARATUS, METHOD, AND MANUFACTURE FOR CORRECTING COLOR SHADING IN CMOS IMAGE SENSORS

CROSS-REFERENCE TO RELATED APPLICATIONS

This application claims the benefit of U.S. Provisional Patent Application 61/094,326, filed Sep. 4, 2008, the benefit of the earlier filing date of which is hereby claimed under 35 U.S.C. §119(e) and which is further incorporated by reference.

FIELD OF THE INVENTION

The invention is related to image sensors, and in particular but not exclusively, to a method and device for correcting color shading in complement metal oxide semiconductor (CMOS) image sensors.

BACKGROUND OF THE INVENTION

In CMOS image sensing, there is typically distortion in image intensity that appears mainly around the edges of an image when captured by a CMOS image sensor, including the artifacts caused by the use of a lens, referred to as color shading. Color planes typically have different centers due to a combination of optical and electrical cross talk between adjacent pixels. This is typically not uniform over the image due to the dependence of the angle of incidence of light on the position within the sensor. In addition, the pixels are typically asymmetrical.

BRIEF DESCRIPTION OF THE DRAWINGS

Non-limiting and non-exhaustive embodiments of the present invention are described with reference to the following drawings, in which.

DETAILED DESCRIPTION

Figure 1:
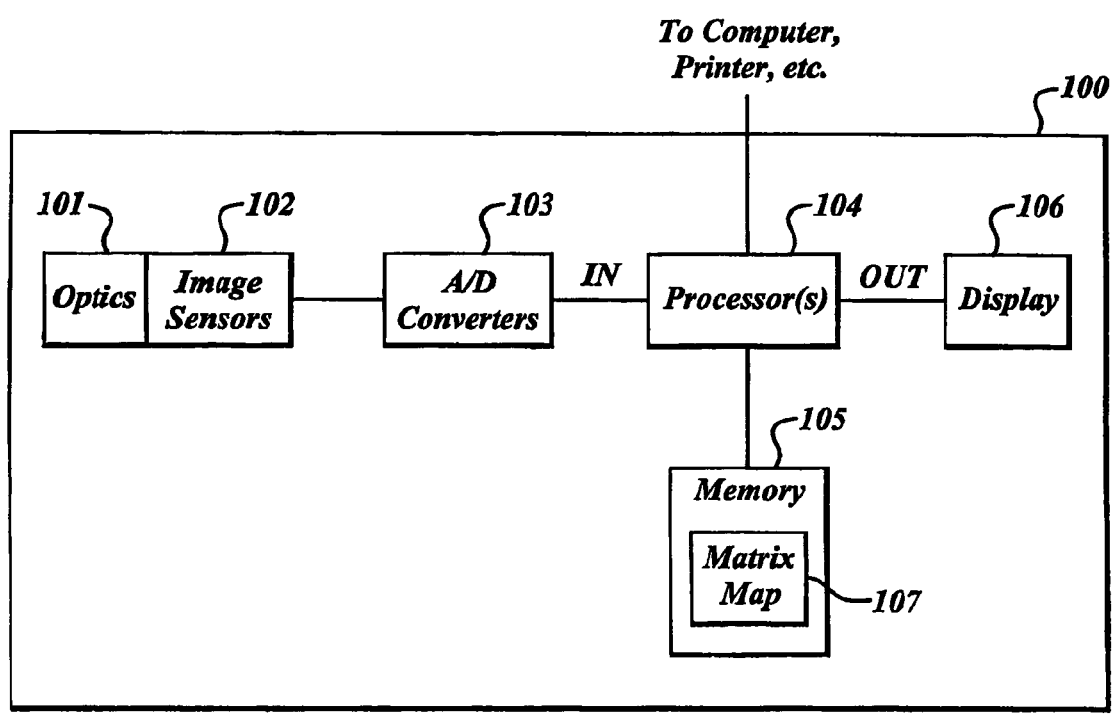
FIG. 1 shows a block diagram of an embodiment of an exemplary operating environment for an embodiment of the invention.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items being connected, or an indirect connection through one or more passive or active intermediary devices.

Briefly stated, a device for color shading correction is provided. Local color matching is performed as follows. For each pixel of the image that is being color matched, the RGB value is treated as a one-by-three matrix, which is multiplied by a three-by-three matrix that is generated during factory calibration. The matrix product is a one-by-three matrix that is used as the RGB value for the pixel in the color matched image.

FIG. 1 shows a block diagram of an embodiment of an exemplary operating environment (100) for an embodiment of the invention. In one embodiment, operating environment 100 may be a digital camera or the like. Operating environment 100 includes a set of optics (e.g., one or more lenses and/or light guides) 101, a set of image sensors 102 optically coupled to the optics 101, a set of analog-to-digital (A/D) converters 103 having inputs electrically coupled to outputs of the image sensors 102, and one or more processors 104 coupled to receive the outputs of the A/D converters 103. The image sensors 102 may produce separate R, G and B color signals. The camera 100 further includes a display device 106 coupled to outputs of the processor(s) 104, and a memory having bi-directional communication with the processor(s) 104.

In operation, the image sensors 102 (CMOS sensors) receive input light through the optics 101 and, in response, produce analog output color signals R, G and B to the A/D converters. The A/D converters convert those input color signals to digital form, which are provided to the processor(s) 104.

The processor(s) 104 may perform any of various well-known types of processing on those input color signals. The processor(s) 104 also may perform color matching and/or other types of signal transformation. The processor(s) 104 may be or include, for example, any one or more of: a programmed microprocessor or digital signal processor (DSP), a microcontroller, an application specific integrated circuit (ASIC), a programmable logic device (PLD), etc. Process 300 may perform various processes, such as the process illustrated in FIGS. 3, 4, 5, and/or 6.

The memory 105 may be or include, for example, anyone or more of: flash memory, read-only memory, random access memory (RAM), etc. Memory 105 may be used to store a matrix map 107.

Processed or raw color data can be output to the display device 106 for display and/or to one or more external devices, such as a computer or printer.

Figure 2:
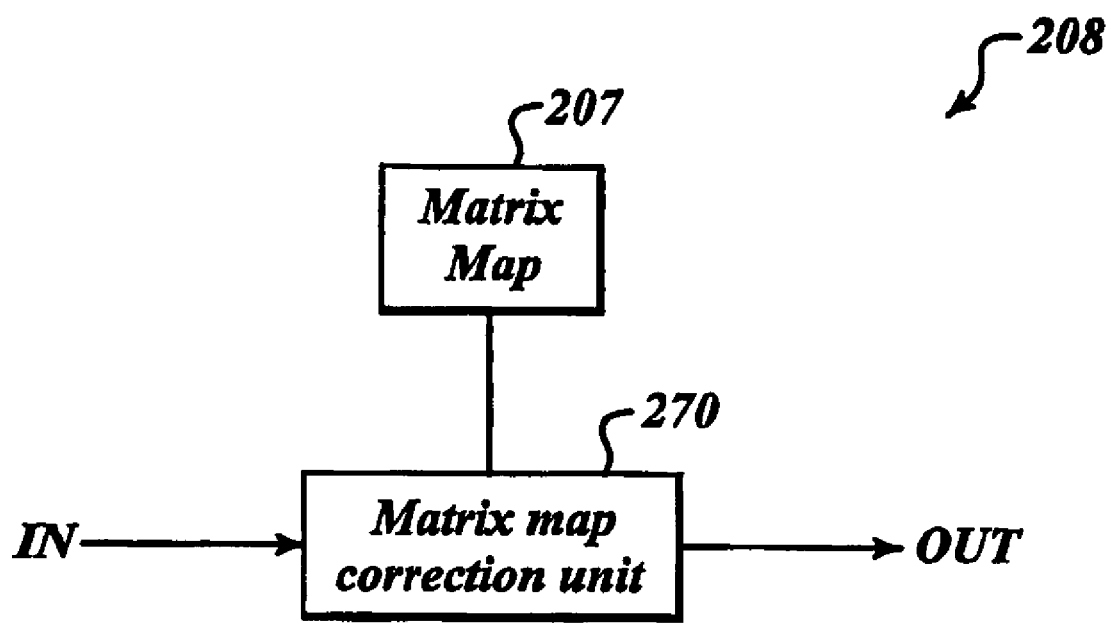
FIG. 2 illustrates a block diagram of an embodiment of a device.

FIG. 2 illustrates a block diagram of an embodiment of device 208. Device 208 includes matrix map 207 and matrix map correction unit 270. Matrix map 207 includes a number of three-by-three matrices, one for each pixel. However, in some embodiments, "one for each pixel" means one for each pixel of a greatly down-scaled image, so that interpolation must be performed to determine the appropriate matrix for each pixel in the image being transformed. In other embodiments, it may include a matrix for every pixel in the actual image.

Matrix map correction unit 270 is arranged to generate output image OUT, which is a color-matched image generated by performing local color matching on color matching input image IN. Matrix map correction unit 270 is arranged to perform the local color matching by, for each pixel of image IN, calculating a matrix product. The matrix product is calculated using the RGB value of the pixel as an RGB three-tuple pixel value that is expressed as a one-by-three matrix. The one-by-three matrix is multiplied by the three-by-three matrix in the matrix map. As previously discussed, in some embodiments, the three-by-three matrix for that pixel location may need to be determined by interpolation if the matrix map does not store the three-by-three matrix for that exact pixel location. The matrix product is a one-by-three matrix. Matrix map correction unit 270 is arranged to generate image OUT by using the matrix product one-by-three matrix is the RGB value for the pixel at that location in image OUT.

Matrix map correction unit 270 may be hardware, software, or a combination of hardware and software.

Although FIG. 2 illustrates only a device performing the function of local color matching, device 208 may also perform other functions, such as other image processing functions (as illustrated in for example FIG. 3 below), and may also perform calibration functions to generate the matrix map (as illustrated in for example FIG. 6 below).

Figure 3:
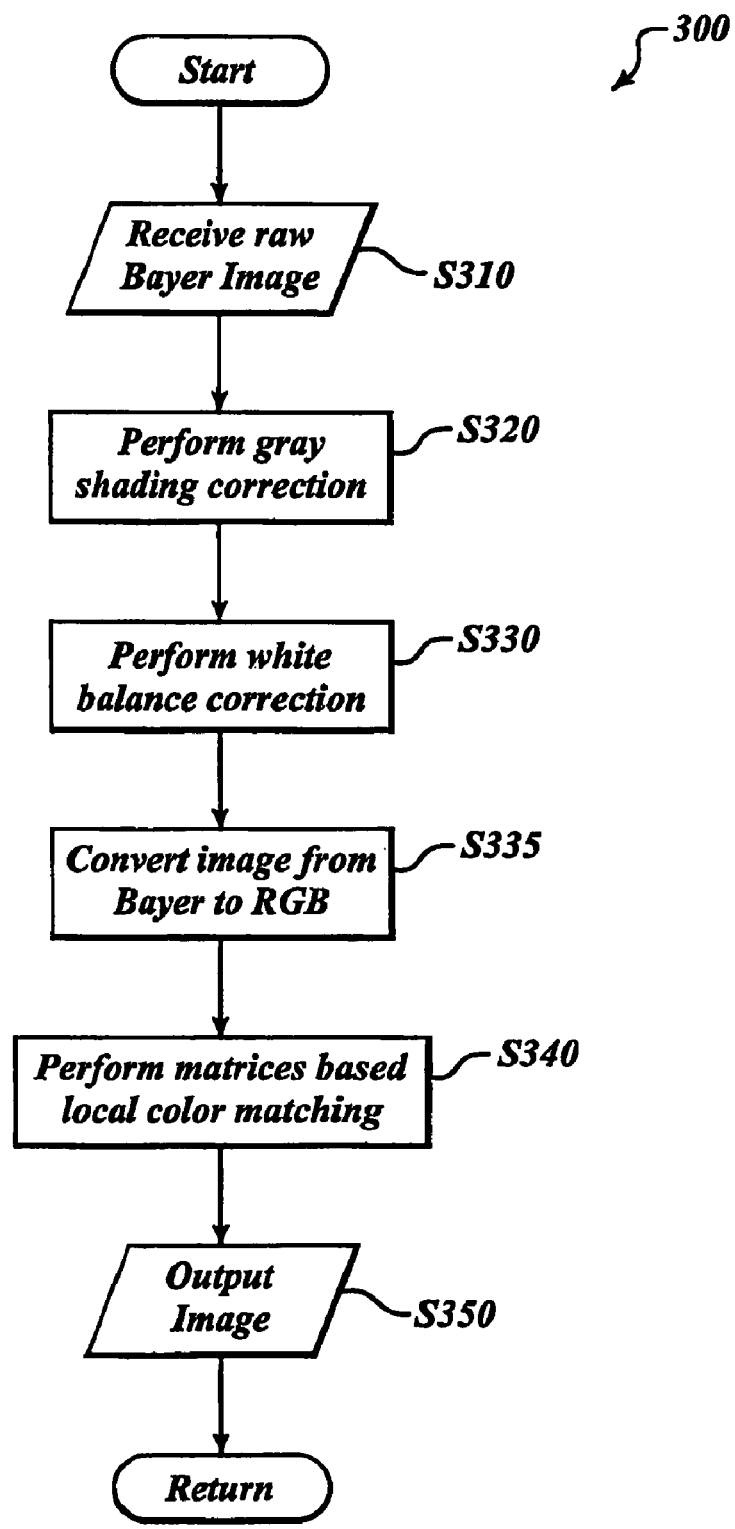
FIG. 3 shows a flow chart of an embodiment of a process of image correction.

FIG. 3 shows a flow chart of an embodiment of a process (300) of image correction. After a start block, the process proceeds to step S310, where a raw Bayer image is received. The process then advances to block S320, where gray shading correction is performed. The process then advances to block S330, where white balance correction is performed. The process then proceeds to block S340, where matrices-based local color matching is performed (as discussed in greater detail above and below). The process then moves to block S350, where the image generated by the local color matching is output. The process then advances to a return block, where other processing is performed.

Various embodiment of process 300 may include more or less steps than illustrated in FIG. 3. For example, in some embodiments, the image received is an RGB image rather than a Bayer image, and so there is no need to convert the image from Bayer to RGB. In some embodiments, gray shading correction and/or white balance correction is not performed, or may be performed in a different order or in a different part of the process than indicated in FIG. 3. These embodiments and others are within the scope and spirit of the invention.

For the grey shading correction, in some embodiments, process 300 is able to perform, fixing of four channels, fixing parabolas with different centers, and fixing both happy and sad parabolas. In these embodiments, the gray shading correction is performed on each of the four color channels on a color basis. The four channels addressed are the R, Gr, Gb, and B channels. Gr is a green pixel having at least two neighboring pixels of red, and Gb is a green pixel having at least two neighboring pixels of blue. In an alternative embodiment a gain map for the four different channels can be used.

Performing the local color matching may allow for a color shading scheme resulting in overall better image quality. It may also enable the ability to use lower quality lenses and image sensors while relying on the correction unit to offset deficiencies and provide a quality image. This may reduce the system cost because the cost of the unit on an integrated circuit (IC) may be trivial in comparison to the cost of a lens and/or a sensor.

Figure 4:
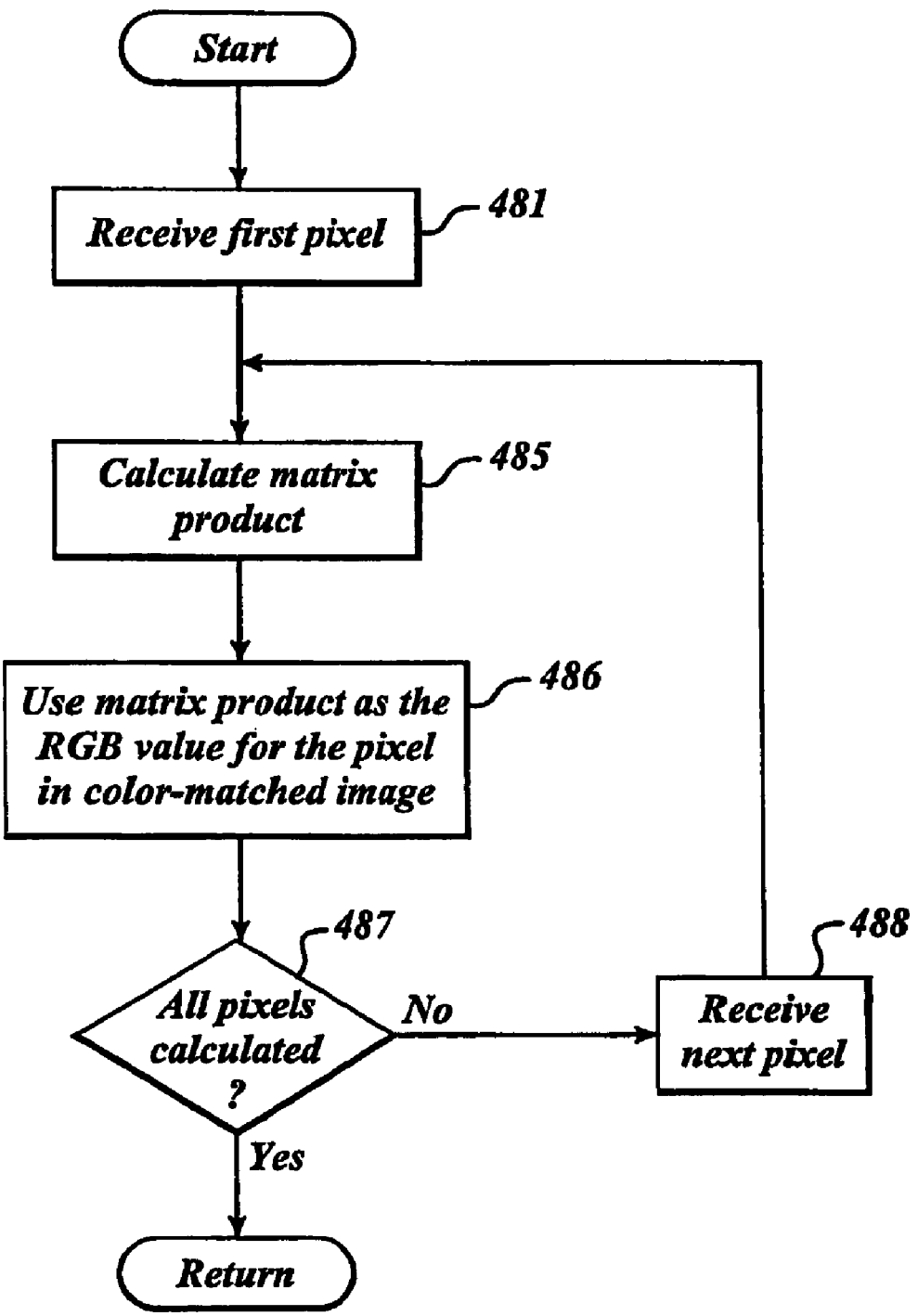
FIG. 4 illustrates a flow chart of an embodiment of a process of color shading correction process.

FIG. 4 illustrates a flow chart of an embodiment of a color shading correction process. For example, this process is an embodiment of step S340 of FIG. 3, and may be performed by device 208 of FIG. 2.

After a start block, the process proceeds to block 481, where a first pixel from the local color matching input image is received. The process then moves to block 485, where a matrix product is calculated. As discussed above, the matrix product is calculated by multiplying a one-by-three matrix which is the RGB value of the pixel by a three-by-three matrix obtained from a matrix map, or by interpolation from values on the matrix map. The process then advances to block 486, where the matrix product, a one-by-three matrix, is used as the RGB pixel value for the pixel at that location in the color-matched image.

At decision block 487, a determination is made as to whether all pixels in the color-matched image have been calculated. If so, the processing proceeds to a return block, where other processing is resumed. Otherwise, the process advances to block 488, where the next pixel from the color matching input image that has not yet been processed to determine the corresponding pixel value in the color matched image is received, and the process then moves to block 485.

Figure 5:
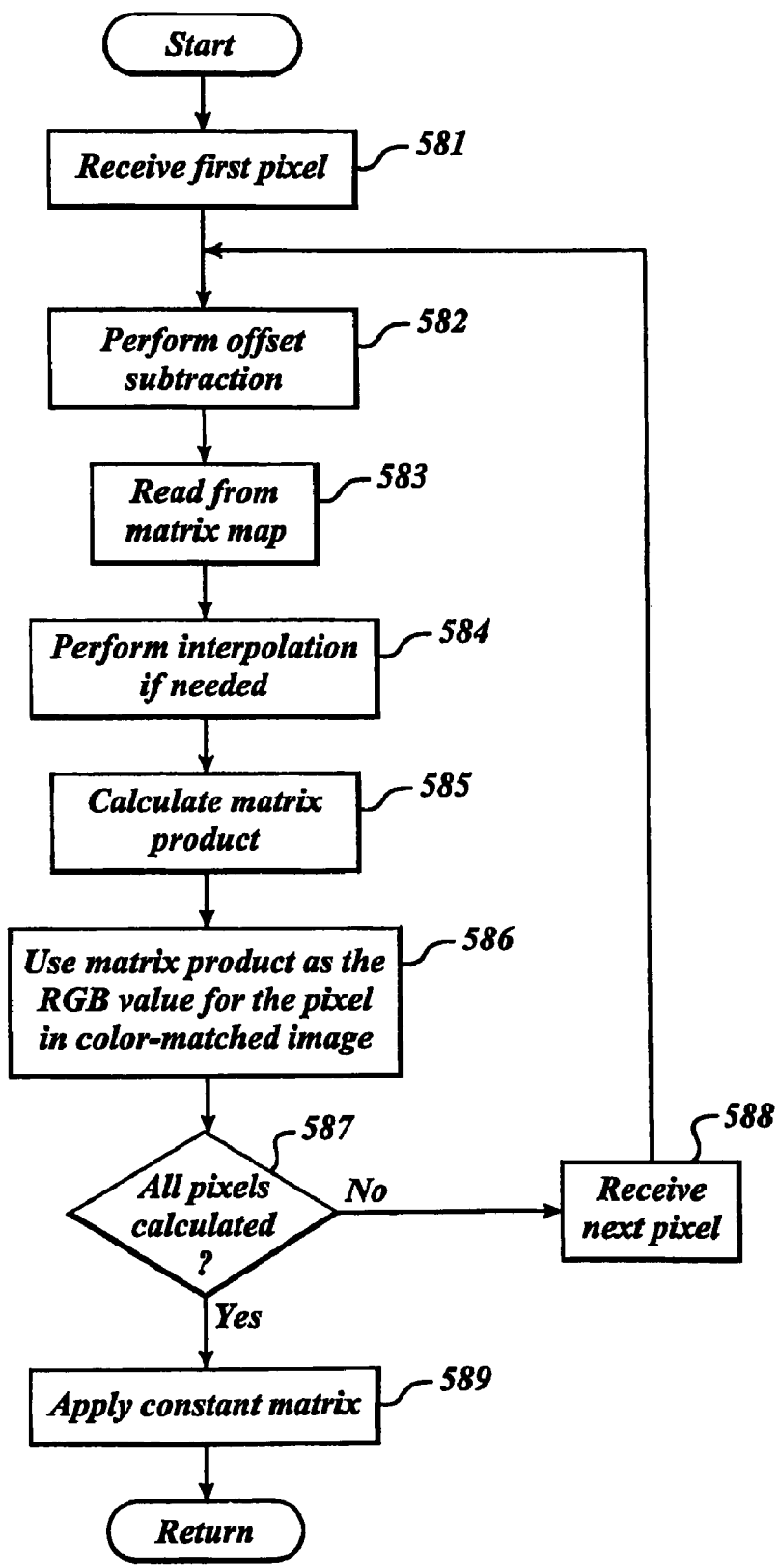
FIG. 5 shows a flow chart of an embodiment of the process of FIG. 4.

FIG. 5 shows a flow chart of an embodiment of a color shading correction process that may be employed as an embodiment of the color shading correction process of FIG. 4.

After a start block, the process proceeds to block 581, where a first pixel from the local color matching input image is received. The process then moves to block 582, where programmable offset is subtracted from each pixel for black level compensation. The process then advances to block 583, where one or more (three-by-three) matrix is read from the matrix map. The process then moves to block 584, where interpolation is performed to determine the matrix to use at the pixel location if the matrix map does not contain the matrix at the exact location of the pixel. At least two values near the pixel location are used to determine the pixel value at the pixel location based on interpolation. For example, in some embodiments, bi-linear interpolation is performed. The process then proceeds to block 585, where a matrix product is calculated. As discussed above, the matrix product is calculated by multiplying a one-by-three matrix which is the RGB value of the pixel by the three-by-three matrix. The process then advances to block 586, where the matrix product, a one-by-three matrix, is used as the RGB pixel value for the pixel at that location in the color-matched image.

At decision block 587, a determination is made as to whether all pixels in the color-matched image have been calculated. If so, the process then moves to block 589, where a programmable constant matrix is applied to the color-matched image. This is done to achieve color matching to provide color correction of the sensor RGB format to the display RGB format. In one embodiment, the customer may select one of several different constant matrices to be applied to the image. The process then moves to the return block, where other processing is performed.

At decision block 587, if the determination is negative, the process advances to block 588, where the next pixel from the color matching input image that has not yet been processed to determine the corresponding pixel value in the color matched image is received, and the process then moves to block 582.

Figure 6:
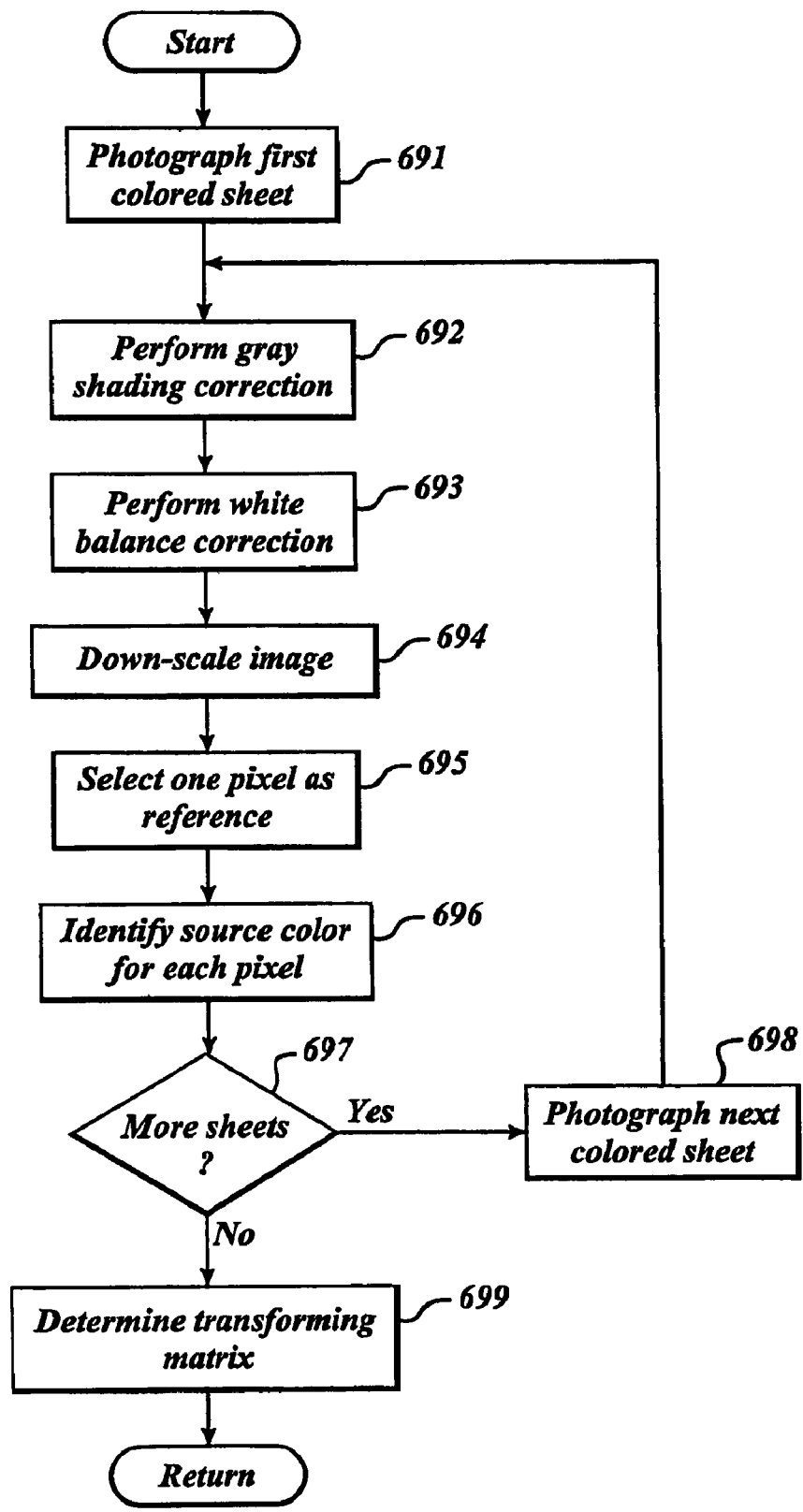
FIG. 6 illustrates a flow chart of an embodiment of a process of calibration.

FIG. 6 illustrates a flow chart of an embodiment of a process of calibration. In one embodiment, this is a process of factory calibration that is performed on each sensor. After a start block, the process moves to block 691, where a first colored sheet is photographed. The process then advances to block 692, where gray shading correction is performed on the image. The process then proceeds to block 693, where white balance correction is performed. The process then moves to block 694, where the image is down-scaled. For example, in one embodiment the image is down-scaled to a three-by-four image having only twelve pixels. The matrix map is sampled sparsely, with uniform sampling, i.e., the distance between adjacent samples along each axis is constant.

The process then advances to block 695, where one of the pixels in the down-scaled image near the center of the image is selected as a reference. For example, if the down-scaled image is a three-by-four image, the second row and second column could be selected as reference pixel. The reference pixel value serves as the target RGB value for each pixel. The process then proceeds to block 696, where the source color for each pixel is identified. The actual pixel value in pixel of the down-scaled image serves as the source RGB value.

The process then moves to decision block 697, where a determination is made as to whether there are more colored sheets to be calibrated, each sheet being a different uniform color. At least three colors are calibrated. For example, in one embodiment, a red sheet, a green sheet, and a blue sheet are calibrated. In other embodiments, other colors such as tan, magenta, yellow, and/or the like may be calibrated in addition to or instead of those colors. If the determination at decision block 697 is positive, the process proceeds to block 698, where the next colored sheet is photographed. The process then moves to block 692.

If the determination at decision block 697 is negative, the process advances to block 699, where a transforming matrix is determined.

The transforming matrix A is the matrix used in local color matching, the three-by-three matrix used to calculate the matrix product (by multiplying the one-by-three RGB pixel value by the three-by-three transforming matrix A). The matrix transformation of the local color matching is applied to the RGB vector in order to correct the colors. A 3×3 transform can perfectly match three colors to three target colors thereby achieving accuracy for three basic colors usually RGB. This is the definition of the transform:

$$T = A \cdot S \quad [1]$$

The goal of the calibration is to find a transforming matrix A such that all column vectors in matrix S are matched to the column vectors in T. The matrices S and T are defined in the following manner:

$$T = \begin{bmatrix} R_1^t & R_2^t & \ldots & R_n^t \\ G_1^t & G_2^t & \ldots & G_n^t \\ B_1^t & B_2^t & \ldots & B_n^t \end{bmatrix}, S = \begin{bmatrix} R_1^s & R_2^s & \ldots & R_n^s \\ G_1^s & G_2^s & \ldots & G_n^s \\ B_1^s & B_2^s & \ldots & B_n^s \end{bmatrix} \quad [2]$$

Where n is the number of colors to be matched (e.g. the number of colored sheets in the calibration). If only three colors are being calibrated, a perfect match is achieved. For n>3, the mean squared error is minimized. The LS equation for matrix A is:

$$\hat{A} = T \cdot S^T (S \cdot S^T)^{-1} \quad [3]$$

For a white point preserving transformation:

$$\hat{A}_c = \hat{A} - (\hat{A} 1_3 - 1_3)[1_3^T (S \cdot S^T)^{-1} 1_3]^{-1} 1_3^T (S \cdot S^T) \quad [4]$$

Where $1^T [1\ 1\ \ldots\ 1]^T$ and the matrix $A_c$ complies with the linear constraint of $$\hat{A}_c 1_3 = 1_3.$$

The color matching is done locally per region. The target vector is the center pixel. As discussed above, in some embodiments, the matrices are calibrated on downsized versions of the image.

As discussed above, T is a matrix with three rows, a first row for red, a second row for green, and a third row for blue, T contains a number of columns equal to the number of calibrations in the plurality of calibrations, where each column is a separate one of the reference RGB values for the down-scaled pixel location; S is a matrix with three rows, a first row for red, a second row for green, and a third row for blue, T contains a number of columns equal to the number of calibrations in the plurality of calibrations, where each column is a separate one of the reference RGB values for the down-scaled pixel location, in the same order the columns of S, where the transforming matrix meets the criterion T=A·S if there are three calibrations in the plurality of calibrations, and where the transforming matrix minimizes the mean square error of T=A·S if there are more than three calibrations in the plurality of calibrations.

The process then proceeds to a return block, whether other processing is resumed.

Various embodiment of the calibration process of FIG. 6 may include more or less steps than shown. For example, in some embodiments, gray shading correction and/or white balance correction is not performed, or may be performed in a different order or in a different part of the process than indicated in FIG. 6. Down-scaling of the image might not be performed in some embodiments. These embodiments and others are within the scope and spirit of the invention.

Figure 7:
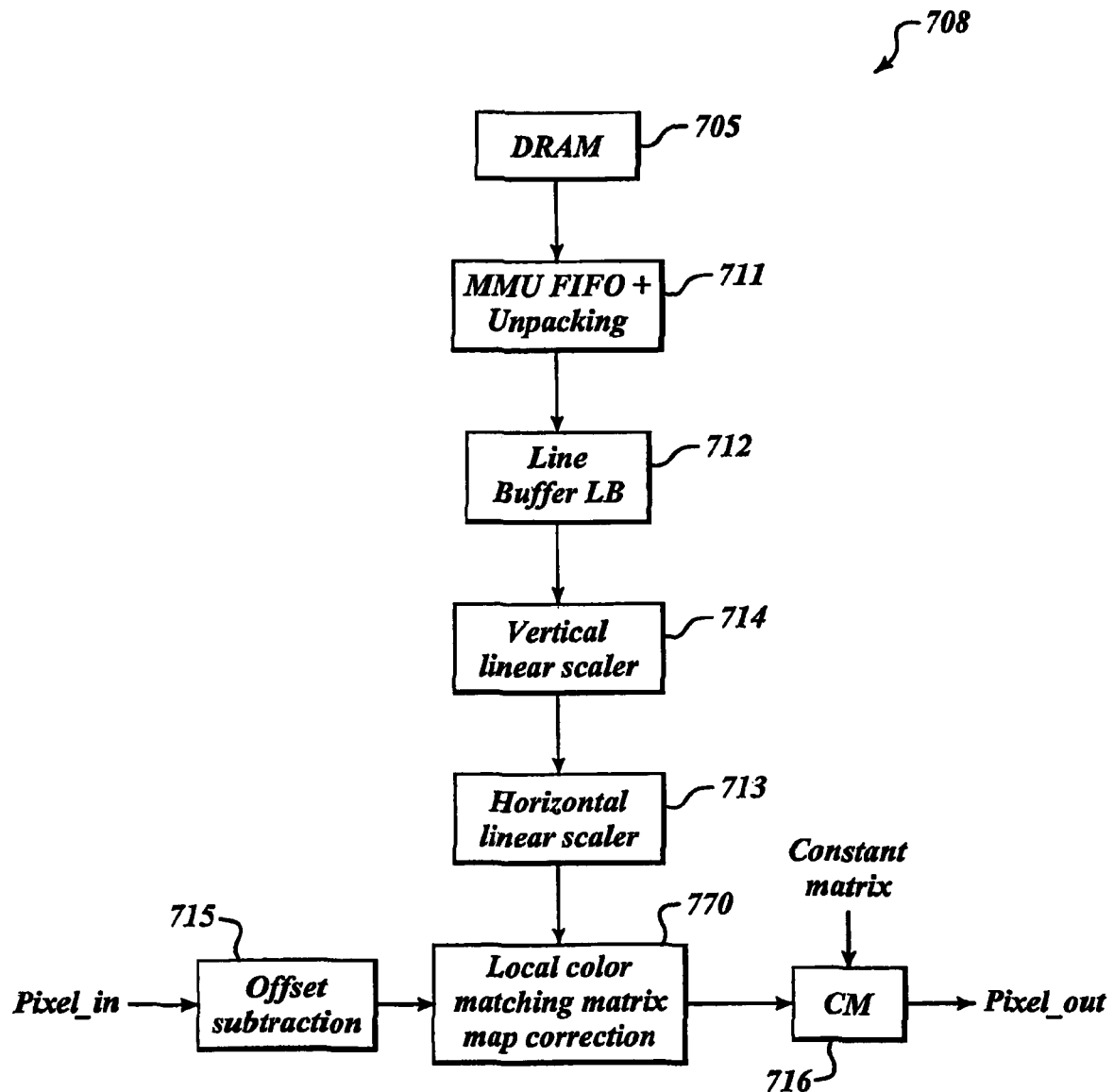
FIG. 7 shows a block diagram of an embodiment of the device of FIG. 2, arranged in accordance with aspects of the present invention.

FIG. 7 shows a block diagram of an embodiment of device 708, which may be employed as an embodiment of device 208 of FIG. 2. An embodiment of matrix map 207 of FIG. 2 is included in dynamic random access memory (DRAM) 705. Device 708 further includes memory management unit (MMU) client 711, line buffer (LB) 712, horizontal scaler 713, vertical scaler 714, offset subtraction unit 715, and constant matrix (CM) unit 716.

Programmable offset unit 715 is arranged to subtract a programmable offset from each input pixel Pixel_In. The matrix map stored in DRAM 715 and read by dedicated MMU client 711. In order to save DRAM 705 space and bandwidth, the matrix map is sampled sparsely. In order to calculate the value of the matrix map at each pixel, device 708 scales up the matrix map read from DRAM 704, using linear scalers 713 and 714. CM unit 716 is arranged to multiply the color-matched pixel by a programmable constant matrix.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A method operating within a processor arranged for color shading correction, comprising:
   receiving from image sensors a plurality of pixels;
   performing local color matching for a color matching input image to generate a color-matched image, wherein the color matching input image is a red-green-blue (RGB) image, the color matching input image includes the plurality of pixels, and wherein performing the local color matching includes:

for each pixel of the color matching input image,
calculating a matrix product by performing matrix multiplication of an RGB three-tuple pixel value as a one-by-three matrix for that pixel by a three-by-three matrix for a pixel location of the pixel; and
employing the matrix product as the RGB pixel value at the pixel location in the color-matched image; and
generating an output image for display on a display device from the color-matched image by performing matrix multiplication on each pixel of the color-matched image by a selectable constant three-by-three matrix.

2. The method of claim 1, further comprising:
performing grey shading correction and white balance correction on an input image to generate a corrected image, wherein the color matching input image is based, at least in part, on the corrected image.

3. The method of claim 2, further comprising:
performing a Bayer-to-RGB transformation on the corrected image to generate the color matching input image, wherein the input image is a raw Bayer image.

4. The method of claim 2, wherein the grey shading correction is performed on each of four color channels on a color basis, where the four channels are red, Gr, Gb, and blue, where Gr represents a green pixel having at least two neighboring pixels of red, and where Gb represents a green pixel having at least two neighboring pixels of blue.

5. The method of claim 1, wherein
the local color matching further includes, for each pixel of the color matching input image:
providing the three-by-three matrix for the pixel location, wherein providing the three-by-matrix includes;
looking up the three-by-three matrix at the pixel location in a matrix map;
if the matrix map does not store a three-by-three matrix at the pixel location, using interpolation to generate the three-by-three matrix for the location based on the three-by-three matrices at least two locations on the matrix map near the pixel location.

6. The method of claim 5, further comprising:
generating the matrix map, wherein generating the matrix map includes:
performing a plurality of calibrations including at least three calibrations, wherein performing each calibration includes:
selecting one of the pixels of a test image as a reference pixel;
for each pixel in the test image:
employing the RGB value at the location of the pixel as the source color for the location of the pixel; and
employing the RGB value at the reference pixel as the target color for the location of the pixel; and
determining a transforming matrix at each pixel location that meets the criterion T=A·S, where A represents the transforming matrix; T is a matrix with three rows, a first row for red, a second row for green, and a third row for blue, T contains a number of columns equal to the number of calibrations in the plurality of calibrations, where each column is a separate one of the reference RGB values for the pixel location; S is a matrix with three rows, a first row for red, a second row for green, and a third row for blue, T contains a number of columns equal to the number of calibrations in the plurality of calibrations, where each column is a separate one of the reference RGB values for the pixel location, in the same order the columns of S, wherein the transforming matrix meets the criterion T=A·S if there are three calibrations in the plurality of calibrations, and wherein the transforming matrix minimizes the mean square error of T=A·S if there are more than three calibrations in the plurality of calibrations.

7. The method of claim 5, further comprising:
generating the matrix map, wherein generating the matrix map includes:
performing a plurality of calibrations including at least three calibrations, wherein performing each calibration includes:
down-scaling a test image, wherein the down-scaled test image includes a plurality of pixels including at least 12 pixels;
selecting one of the pixels of the down-scaled test image as a reference pixel;
for each pixel in the down-scaled test image:
employing the RGB value at the location of the pixel as the source color for the location of the pixel; and
employing the RGB value at the reference pixel as the target color for the location of the pixel; and
determining a transforming matrix at each down-scaled pixel location that meets the criterion T=A·S, where A represents the transforming matrix; T is a matrix with three rows, a first row for red, a second row for green, and a third row for blue, T contains a number of columns equal to the number of calibrations in the plurality of calibrations, where each column is a separate one of the reference RGB values for the down-scaled pixel location; S is a matrix with three rows, a first row for red, a second row for green, and a third row for blue, T contains a number of columns equal to the number of calibrations in the plurality of calibrations, where each column is a separate one of the reference RGB values for the down-scaled pixel location, in the same order the columns of S, wherein the transforming matrix meets the criterion T=A·S if there are three calibrations in the plurality of calibrations, and wherein the transforming matrix minimizes the mean square error of T=A·S if there are more than three calibrations in the plurality of calibrations.

8. The method of claim 7, wherein
performing each calibration further includes:
prior to down-scaling the test image, performing gray shading correction and white balance correction on the test image.

9. A device for color shading correction, comprising:
a matrix map stored in memory; and
a matrix map correction unit that is configured to:
perform local color matching for a color matching input image to generate a color-matched image, wherein the color matching input image is a red-green-blue (RGB) image, the color matching input image includes a plurality of pixels, such that performing the local color matching includes:
for each pixel of the color matching input image,
calculating a matrix product by performing matrix multiplication of an RGB three-tuple pixel value as a one-by-three matrix for that pixel by a three-by-three matrix for pixel location of the pixel; and
employing the matrix product as the RGB pixel value at the pixel location in the color-matched image; and
a constant matrix unit that is arranged to generate an output image from the color-matched image by performing matrix multiplication on each pixel of the color-matched image by a selectable constant three-by-three matrix.

10. The device of claim 9, wherein
the matrix map correction unit is further arranged to perform the local color matching by, for each pixel of the color matching input image:
providing the three-by-three matrix for the pixel location, wherein providing the three-by-matrix includes;
looking up the three-by-three matrix at the pixel location in a matrix map;
if the matrix map does not store a three-by-three matrix at the pixel location, using interpolation to generate the three-by-three matrix for the location based on the three-by-three matrices at least two locations on the matrix map near the pixel location.

11. The device of claim 10, wherein:
the matrix map correction unit is further arranged to generate the matrix map by:
performing a plurality of calibrations including at least three calibrations, wherein performing each calibration includes:
selecting one of the pixels of a test image as a reference pixel;
for each pixel in the test image:
employing the RGB value at the location of the pixel as the source color for the location of the pixel; and
employing the RGB value at the reference pixel as the target color for the location of the pixel; and
determining a transforming matrix at each pixel location that meets the criterion T=A·S, where A represents the transforming matrix; T is a matrix with three rows, a first row for red, a second row for green, and a third row for blue, T contains a number of columns equal to the number of calibrations in the plurality of calibrations, where each column is a separate one of the reference RGB values for the pixel location; S is a matrix with three rows, a first row for red, a second row for green, and a third row for blue, T contains a number of columns equal to the number of calibrations in the plurality of calibrations, where each column is a separate one of the reference RGB values for the pixel location, in the same order the columns of S, wherein the transforming matrix meets the criterion T=A·S if there are three calibrations in the plurality of calibrations, and wherein the transforming matrix minimizes the mean square error of T=A·S if there are more than three calibrations in the plurality of calibrations.

12. An article of manufacture including a processor-readable medium having processor-executable code stored therein, which when executed by one or more processors, enables actions for color shading correction, comprising:
performing local color matching for a color matching input image to generate a color-matched image, wherein the color matching input image is a red-green-blue (RGB) image, the color matching input image includes a plurality of pixels, and wherein performing the local color matching includes:
for each pixel of the color matching input image,
calculating a matrix product by performing matrix multiplication of an RGB three-tuple pixel value as a one-by-three matrix for that pixel by a three-by-three matrix for a pixel location of the pixel; and
employing the matrix product as the RGB pixel value at the pixel location in the color-matched image; and
generating an output image from the color-matched image by performing matrix multiplication on each pixel of the color-matched image by a selectable constant three-by-three matrix.

13. The article of manufacture of claim 12, the actions further comprising:
performing grey shading correction and white balance correction on an input image to generate a corrected image, wherein the color matching input image is based, at least in part, on the corrected image.

14. The article of manufacture of claim 13, the actions further comprising:
performing a Bayer-to-RGB transformation on the corrected image to generate the color matching input image, wherein the input image is a raw Bayer image.

15. The article of manufacture of claim 13, wherein the grey shading correction is performed on each of four color channels on a color basis, where the four channels are red, Gr, Gb, and blue, where Gr represents a green pixel having at least two neighboring pixels of red, and where Gb represents a green pixel having at least two neighboring pixels of blue.

16. The article of manufacture of claim 12, wherein
the local color matching further includes, for each pixel of the color matching input image:
providing the three-by-three matrix for the pixel location, wherein providing the three-by-matrix includes;
looking up the three-by-three matrix at the pixel location in a matrix map;
if the matrix map does not store a three-by-three matrix at the pixel location, using interpolation to generate the three-by-three matrix for the location based on the three-by-three matrices at least two locations on the matrix map near the pixel location.

17. The article of manufacture of claim 16, the actions further comprising:
generating the matrix map, wherein generating the matrix map includes:
performing a plurality of calibrations including at least three calibrations, wherein performing each calibration includes:
selecting one of the pixels of a test image as a reference pixel;
for each pixel in the test image:
employing the RGB value at the location of the pixel as the source color for the location of the pixel; and
employing the RGB value at the reference pixel as the target color for the location of the pixel; and
determining a transforming matrix at each pixel location that meets the criterion T=A·S, where A represents the transforming matrix; T is a matrix with three rows, a first row for red, a second row for green, and a third row for blue, T contains a number of columns equal to the number of calibrations in the plurality of calibrations, where each column is a separate one of the reference RGB values for the pixel location; S is a matrix with three rows, a first row for red, a second row for green, and a third row for blue, T contains a number of columns equal to the number of calibrations in the plurality of calibrations, where each column is a separate one of the reference RGB values for the pixel location, in the same order the columns of S, wherein the transforming matrix meets the criterion T=A·S if there are three calibrations in the plurality of calibrations, and wherein the transforming matrix minimizes the mean square error of T=A·S if there are more than three calibrations in the plurality of calibrations.

* * * * *